US011248152B2

(12) United States Patent
Takahashi et al.

(10) Patent No.: US 11,248,152 B2
(45) Date of Patent: Feb. 15, 2022

(54) COMPOSITION CONTAINING COOLANT, HEAT TRANSFER MEDIUM AND HEAT CYCLE SYSTEM

(71) Applicant: DAIKIN INDUSTRIES, LTD., Osaka (JP)

(72) Inventors: Kazuhiro Takahashi, Osaka (JP); Shun Ohkubo, Osaka (JP); Mitsushi Itano, Osaka (JP); Tatsuya Takakuwa, Osaka (JP); Kei Kuramoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/049,432

(22) PCT Filed: Apr. 18, 2019

(86) PCT No.: PCT/JP2019/016616
§ 371 (c)(1),
(2) Date: Oct. 21, 2020

(87) PCT Pub. No.: WO2019/208382
PCT Pub. Date: Oct. 31, 2019

(65) Prior Publication Data
US 2021/0079279 A1    Mar. 18, 2021

(30) Foreign Application Priority Data

Apr. 25, 2018   (JP) ............................. JP2018-084358

(51) Int. Cl.
*C09K 5/04* (2006.01)
(52) U.S. Cl.
CPC ........ *C09K 5/045* (2013.01); *C09K 2205/106* (2013.01); *C09K 2205/126* (2013.01); *C09K 2205/40* (2013.01)

(58) Field of Classification Search
CPC .............. C09K 2205/122; C09K 5/045; C09K 2005/126; C09K 2005/106
See application file for complete search history.

(56) References Cited

U.S. PATENT DOCUMENTS

2005/0253107 A1*  11/2005  Flynn .................... C09K 5/041
                                                            252/67
2015/0377533 A1*  12/2015  Harkins ................ F25B 31/002
                                                             62/77
(Continued)

FOREIGN PATENT DOCUMENTS

CN          1789367        6/2006
CN        104449580        3/2015
(Continued)

OTHER PUBLICATIONS

International Search Report dated Jul. 30, 2019 in International (PCT) Application No. PCT/JP2019/016616.
(Continued)

*Primary Examiner* — John R Hardee
(74) *Attorney, Agent, or Firm* — Wenderoth, Lind & Ponack, L.L.P.

(57) ABSTRACT

The present disclosure provides a composition comprising a refrigerant characterized by having a GWP lower than that of R410A and a COP equivalent to that of R410A. Specifically, the present disclosure provides a composition comprising a refrigerant, the refrigerant comprising $CO_2$ (R744) and at least one compound A selected from the group consisting of trans-1,2-difluoroethylene [(E)-HFO-1132], cis-1,2-difluoroethylene [(Z)-HFO-1132], fluoroethylene (HFO-1141), and 3,3,3-trifluoropropyne (TFP).

8 Claims, 1 Drawing Sheet

(56) References Cited

U.S. PATENT DOCUMENTS

| | | | | |
|---|---|---|---|---|
| 2016/0046548 A1* | 2/2016 | Bonnet | ............... | C01B 7/19 |
| | | | | 252/182.12 |
| 2016/0075927 A1 | 3/2016 | Fukushima | | |
| 2016/0097569 A1* | 4/2016 | Matsunaga | ............ | F25B 49/02 |
| | | | | 62/324.6 |
| 2017/0058173 A1 | 3/2017 | Fukushima | | |

FOREIGN PATENT DOCUMENTS

| | | |
|---|---|---|
| CN | 106414654 | 2/2017 |
| JP | 2015-214632 | 12/2015 |
| JP | 2016-56374 | 4/2016 |
| JP | 2017-186563 | 10/2017 |
| WO | 2005/108523 | 11/2005 |

OTHER PUBLICATIONS

Extended European Search Report dated Dec. 15, 2021 in corresponding European Patent Application No. 19792063.0.

* cited by examiner

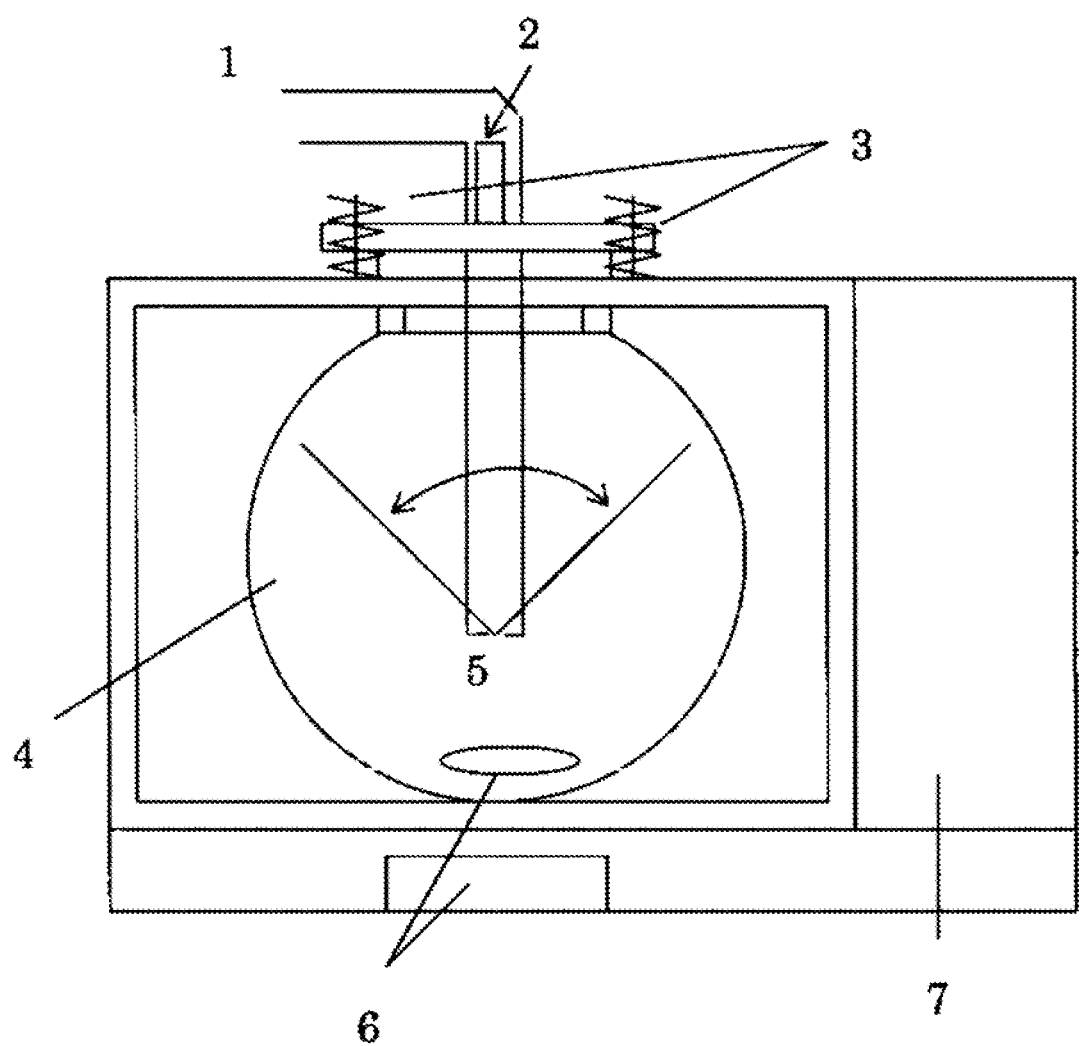

COMPOSITION CONTAINING COOLANT, HEAT TRANSFER MEDIUM AND HEAT CYCLE SYSTEM

TECHNICAL FIELD

The present disclosure relates to a composition comprising a refrigerant, a heat transfer medium, and a heat cycle system.

BACKGROUND ART

Amid worldwide discussion about global warming as a highly serious issue, the development of environmentally friendly heat cycle systems, such as air conditioners and refrigeration apparatuses, has become increasingly important.

Various mixed refrigerants that have a low global warming potential (GWP) and that can replace R410A, which is used as a refrigerant for air conditioners, such as home air conditioners, have currently been proposed (Patent Literature (PTL) 1 and 2).

CITATION LIST

Patent Literature

PTL 1: JP2016-056374A
PTL 2: JP2017-186563A

SUMMARY OF INVENTION

Technical Problem

Neither PTL 1 nor PTL 2 discloses a refrigerant characterized by having a GWP lower than that of R410A and a coefficient of performance (also simply referred to below as "COP") equivalent to that of R410A.

An object of the present disclosure is to provide a composition comprising a refrigerant characterized by having a GWP lower than that of R410A and a COP equivalent to that of R410A.

Solution to Problem

The present disclosure provides the invention according to the following embodiments.
Item 1.
A composition comprising a refrigerant, the refrigerant comprising $CO_2$ (R744) and at least one compound A selected from the group consisting of trans-1,2-difluoroethylene [(E)-HFO-1132], cis-1,2-difluoroethylene [(Z)-HFO-1132], fluoroethylene (HFO-1141), and 3,3,3-trifluoropropyne (TFP).
Item 2.
The composition according to Item 1, wherein R744 is present in an amount of 0.1 to 50 mass %, and the compound A is present in an amount of 50 to 99.9 mass %, based on the total amount of R744 and the compound A taken as 100 mass %.
Item 3.
The composition according to Item 1 or 2, wherein the refrigerant further comprises at least one compound B selected from the group consisting of tetrafluoromethane (FC-14), trifluoromethane (HFC-23), difluoromethane (HFC-32), pentafluoroethane (HFC-125), 1,1,1,2-tetrafluoroethane (HFC-134a), 1,1,2,2-tetrafluoroethane (HFC-134), 1,1-difluoroethane (HFC-152a), 1,2-difluoroethane (HFC-152), 1,1,1-trifluoroethane (HFC-143a), 1,1,2-trifluoroethane (HFC-143), 1,1,1,2,3,3,3-heptafluoropropane (HFC-227ea), 2,3,3,3-tetrafluoropropene (HFO-1234yf), trans-1,3,3-tetrafluoropropene [(E)-HFO-1234ze], 1,2,3,3,3-pentafluoropropene (HFO-1225ye), 3,3,3-trifluoropropene (HFO-1243zf), and difluoropropene (HFO-1252).
Item 4.
The composition according to any one of Items 1 to 3, for use as an alternative refrigerant for R410A.
Item 5.
The composition according to any one of Items 1 to 4, the composition further comprising a refrigeration oil and being for use as a working fluid for a refrigeration apparatus.
Item 6.
A refrigeration apparatus comprising the composition according to any one of Items 1 to 5 as a working fluid.
Item 7.
A heat transfer medium comprising the composition according to any one of Items 1 to 5.
Item 8.
A heat cycle system using the heat transfer medium according to Item 7.

Advantageous Effects of Invention

The composition comprising a refrigerant according to the present disclosure is characterized by having a GWP lower than that of R410A and a COP equivalent to that of R410A.

BRIEF DESCRIPTION OF DRAWINGS

FIG. 1 is a diagram illustrating an experimental apparatus for examining flammability (flammable or non-flammable).

DESCRIPTION OF EMBODIMENTS

To solve the above problems, the present inventors conducted extensive research and found that a composition comprising, as a refrigerant, $CO_2$ (R744) and a specific ethylene-based fluoroolefin etc. has the above characteristics.

The present disclosure has been completed as a result of further research based on the above finding. The present disclosure encompasses the following embodiments.

Definition of Terms

In the present specification, the terms "comprise" and "contain" includes the concepts of "consisting essentially of" and "consisting of."

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have characteristics equivalent to those of such refrigerants, even though a refrigerant number is not yet given.

Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants), (2) a composition that can be used for obtaining a working fluid for a refrigeration apparatus by further comprising one or more other components and mixing with at least a refrigeration oil, and (3) a working fluid for a refrigeration apparatus, containing a refrigeration oil.

In the present specification, of these three embodiments, the composition (2) is referred to as a "refrigerant composition" to distinguish it from a refrigerant itself (including a mixture of refrigerants).

In the present specification, when the term "alternative" is used in a context in which the first refrigerant is replaced with the second refrigerant, the first type of alternative means that equipment designed for operation using the first refrigerant can be operated using the second refrigerant under optimum conditions, optionally with changes of only a few parts (at least one of the following: refrigeration oil, gasket, packing, expansion valve, dryer, other parts) and equipment adjustment. In other words, this type of alternative means that the same equipment is operated with an alternative refrigerant. Embodiments of this type of alternative include "drop-in alternatives", "nearly drop-in alternatives", and "retrofits", in the order in which the extent of changes and adjustment necessary for replacing the first refrigerant with the second refrigerant is smaller.

The term "alternative" also includes a second type of alternative, which means that equipment designed for operation using the second refrigerant is operated for the same use as the existing use with the first refrigerant by using the second refrigerant. This type of alternative means that the same use is achieved with an alternative refrigerant.

In the present specification, the term "refrigeration apparatus" refers to apparatuses in general that draw heat from an object or space to make its temperature lower than the temperature of the ambient air, and maintain the low temperature. In other words, refrigeration apparatuses in the broad sense refer to conversion apparatuses that gain energy from the outside to do work, and that perform energy conversion, in order to transfer heat from where the temperature is lower to where the temperature is higher. In the present disclosure, "refrigeration apparatus" is synonymous with "heat pump" in the broad sense.

In the present disclosure, the term "refrigeration apparatus" is distinguished from "heat pump" in the narrow sense, depending on the difference in the applied temperature range and operating temperature. In this case, an apparatus whose low-temperature heat source is placed in a temperature range lower than the air temperature may be called a "refrigeration apparatus," while an apparatus whose low-temperature heat source is placed near the air temperature to use the heat-release action caused by driving the refrigeration cycle may be called a "heat pump." Additionally, there are apparatuses that have both the function of refrigeration apparatuses in the narrow sense and the function of heat pumps in the narrow sense, despite them being a single machine, such as air conditioners that provide both a cooling mode and a heating mode. In the present specification, unless otherwise indicated, the terms "refrigeration apparatus" and "heat pump" are used in the broad sense throughout the specification.

In the present specification, the term "air-conditioning system for vehicles" is a type of refrigeration apparatus for use in vehicles, such as gasoline vehicles, hybrid vehicles, electric vehicles, and hydrogen vehicles. The air-conditioning system for vehicles refers to a refrigeration apparatus that has a refrigeration cycle in which heat exchange is performed by an evaporator using a liquid refrigerant, the evaporated refrigerant gas is absorbed by a compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator.

In the present specification, the term "turbo refrigerating machine" is a type of large refrigeration apparatus and refers to a refrigeration apparatus that has a refrigeration cycle in which heat exchange is performed by an evaporator using a liquid refrigerant, the evaporated refrigerant gas is absorbed by a centrifugal compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator. The term "large refrigerating machine" refers to a large air-conditioner that is intended for air conditioning in a unit of a building.

In the present specification, "non-flammable" refrigerants refer to those whose worst case of formulation for flammability (WCF), which is the most flammable composition in the allowable refrigerant concentration range according to the US ANSI/ASHRAE Standard 34-2013, is classified as Class 1.

In the present specification, "slightly flammable" refrigerants refer to those whose WCF formulation is classified as Class 2L according to the US ANSI/ASHRAE Standard 34-2013.

In the present specification, "weakly flammable" refrigerants refer to those whose WCF formulation is classified as Class 2 according to the US ANSI/ASHRAE Standard 34-2013.

In the present specification, the term "temperature glide" can be rephrased as an absolute value of the difference between the starting temperature and the ending temperature of the phase change process of the composition comprising a refrigerant according to the present disclosure within the constituent elements of a refrigerant system.

In the present specification, the GWP is evaluated based on the values stated in the Intergovernmental Panel on Climate Change (IPCC) fourth report.

1. Refrigerant 1-1 Refrigerant Components

Mixed Refrigerant Comprising R744 and Compound A

The refrigerant according to the present disclosure is a mixed refrigerant comprising $CO_2$ (R744) as an essential component and comprising at least one compound A selected from the group consisting of trans-1,2-difluoroethylene [(E)-HFO-1132], cis-1,2-difluoroethylene [(Z)-HFO-1132], fluoroethylene (HFO-1141), and 3,3,3-trifluoropropyne ($CF_3C{\equiv}CH$; TFP).

The refrigerant according to the present disclosure has the above feature and thus has the following characteristics generally required for an alternative refrigerant for R410A: (1) the GWP is sufficiently lower than that (2088) of R410A, and (2) the refrigerant has a COP almost equivalent to that of R410A. Moreover, at least part of the refrigerant according to the present disclosure further has the characteristic that (3) it has a refrigerating capacity almost equivalent to that of R410A.

The compound A according to the present disclosure is at least one compound selected from the group consisting of (E)-HFO-1132, (Z)-HFO-1132, HFO-1141, and TFP.

When single compound A is used, among the above compounds A, (E)-HFO-1132, HFO-1141, or TFP is preferable, and (E)-HFO-1132 or HFO-1141 is more preferable, from the viewpoint of a COP almost equivalent to that of R410A and a refrigerating capacity almost equivalent to, or higher than, that of R410A.

When two or more of the above compounds A are used in combination, it is preferable to use at least one compound selected from the group consisting of (E)-HFO-1132 and HFO-1141, from the viewpoint of a COP almost equivalent to that of R410A and a refrigerating capacity almost equivalent to, or higher than, that of R410A.

The refrigerant according to the present disclosure is preferably a mixed refrigerant in which R744 is present in an amount of 0.1 to 50 mass %, and the compound A is present in an amount of 50 to 99.9 mass %, based on the total amount of R744 and the compound A taken as 100 mass %. In this case, the refrigerant according to the present disclosure has a GWP of 1 or less, a COP almost equivalent to that of R410A, and a more excellent refrigerating capacity ratio relative to R410A.

The refrigerant according to the present disclosure is more preferably a mixed refrigerant in which R744 is present in an amount of 2.5 to 10 mass %, and the compound A is present in an amount of 90 to 97.5 mass %, based on the total amount of R744 and the compound A taken as 100 mass %. In this case, the refrigerant according to the present disclosure has a GWP of 1 or less, a temperature glide of 15° C. or less, a COP almost equivalent to that of R410A, and an even more excellent refrigerating capacity ratio relative to R410A.

The refrigerant according to the present disclosure is preferably a mixed refrigerant containing (E)-HFO-1132, (Z)-HFO-1132, HFO-1141, or TFP as a compound in an amount of 99.9 mass % or less, and more preferably 95 mass % or less. When the content of the compound is within the above range, for example, polymerization reaction of the refrigerant that may locally occur under an environment at 200° C. or more and 8 MpaG or more (under a high-temperature and high-pressure environment) in a compressor can be suppressed, thus stably maintaining the refrigerant.

Mixed Refrigerant Comprising R744, Compound a, and Compound B

The compound A described in the "Mixed Refrigerant Comprising R744 and Compound A" section above can be used as the compound A in this section.

The refrigerant according to the present disclosure is preferably a mixed refrigerant comprising $CO_2$ (R744) and the compound A and further comprising at least one compound B selected from the group consisting of tetrafluoromethane (FC-14), trifluoromethane (HFC-23), difluoromethane (HFC-32), pentafluoroethane (HFC-125), 1,1,1,2-tetrafluoroethane (HFC-134a), 1,1,2,2-tetrafluoroethane (HFC-134), 1,1-difluoroethane (HFC-152a), 1,2-difluoroethane (HFC-152), 1,1,1-trifluoroethane (HFC-143a), 1,1,2-trifluoroethane (HFC-143), 1,1,1,2,3,3,3-heptafluoropropane (HFC-227ea), 2,3,3,3-tetrafluoropropene (HFO-1234yf), trans-1,3,3,3-tetrafluoropropene [(E)-HFO-1234ze], 1,2,3,3,3-pentafluoropropene (HFO-1225ye), 3,3,3-trifluoropropene (HFO-1243zf), and difluoropropene (HFO-1252).

The refrigerant according to the present disclosure has the above feature and thus has the following desirable characteristics as an alternative refrigerant for R410A: (1) the GWP is sufficiently low, (2) the refrigerant has a COP equivalent to that of R410A, and (3) the refrigerant has a refrigerating capacity equivalent to that of R410A.

Examples of the compound B according to the present disclosure include FC-14, HFC-23, HFC-32, HFC-125, HFC-134a, HFC-134, HFC-152a, HFC-152, HFC-143a, HFC-143, HFC-227ea, HFO-1234yf, (E)-HFO-1234ze, HFO-1225ye, HFO-1243zf, and HFO-1252. These compounds B may be used singly or in a combination of two or more.

When single compound B is used, among the above compounds B, HFC-32, HFC-134, HFC-134a, HFC-152a, HFC-152, HFO-1234yf, (E)-HFO-1234ze, HFO-1225ye, HFO-1243zf, or HFO-1252 is preferable, HFC-32 or (E)-HFO-1234ze is more preferable, and HFC-32 is particularly preferable, from the viewpoint of the GWP, COP, and refrigerating capacity.

When two or more of the above compounds B are used in combination, a combination of HFC-134 and HFC-32, a combination of HFC-134a and HFC-32, or a combination of HFC-134, HFC-134a, and HFC-32 is preferable, from the viewpoint of the flammability, GWP, COP, and refrigerating capacity. Among these combinations, the combination of HFC-134a and HFC-32 is more preferable.

The refrigerant according to the present disclosure is preferably a mixed refrigerant in which R744 is present in an amount of 0.1 to 10 mass %, and the compound B is present in an amount of 10 to 50 mass %, based on the total amount of R744, the compound A, and the compound B taken as 100 mass %. In this case, the refrigerant according to the present disclosure has a GWP of 750 or less, a COP equivalent to that of R410A, and a more excellent refrigerating capacity ratio relative to R410A.

The refrigerant according to the present disclosure is preferably a mixed refrigerant shown in any of (1) to (6) below:

(1) a mixed refrigerant in which R744 is present in an amount of 0.1 to 10 mass %, and HFC-134a is present as the compound B in an amount of 30 to 52 mass %, based on the total amount of R744, the compound A, and the compound B taken as 100 mass %, and the remainder is the compound A, (2) a mixed refrigerant in which R744 is present in an amount of 0.1 to 10 mass %; and as the compound B, HFC-134a is present in an amount of 30 to 52 mass %, and HFC-32 is present in an amount of 0.1 to 30 mass %, based on the total amount of R744, the compound A, and the compound B taken as 100 mass %, and the remainder is the compound A, (3) a mixed refrigerant in which R744 is present in an amount of 0.1 to 10 mass %, and HFC-134 is present as the compound B in an amount of 30 to 52 mass %, based on the total amount of R744, the compound A, and the compound B taken as 100 mass %, and the remainder is the compound A, (4) a mixed refrigerant in which R744 is present in an amount of 0.1 to 10 mass %; and as the compound B, HFC-134 is present in an amount of 30 to 52 mass %, and HFC-32 is present in an amount of 0.1 to 30 mass %, based on the total amount of R744, the compound A, and the compound B taken as 100 mass %, and the remainder is the compound A, (5) a mixed refrigerant in which R744 is present in an amount of 0.1 to 10 mass %, and HFC-134a and HFC-134 are present as the compound B in a total amount of 30 to 52 mass %, based on the total amount of R744, the compound A, and the compound B taken as 100 mass %, and the remainder is the compound A, (6) a mixed refrigerant in which R744 is present in an amount of 0.1 to 10 mass %; and as the compound B, HFC-134a and HFC-134 are present in a total amount of 30 to 52 mass %, and HFC-32 is present in an amount of 0.1 to 30 mass %, based on the total amount of R744, the compound A, and the compound B taken as 100 mass %, and the remainder is the compound A.

When the refrigerant according to the present disclosure is the mixed refrigerant shown in any of (1) to (6) above, the refrigerant has a GWP of 750 or less, is non-flammable, and has a COP equivalent to that of R410A and an even more excellent refrigerating capacity ratio relative to R410A.

The refrigerant according to the present disclosure may be a mixed refrigerant further comprising one or more additional refrigerants in addition to R744, the compound A, and the compound B as long as the above characteristics and effects are not impaired. In this case, the total amount of R744, the compound A, and the compound B is preferably 99.5 mass % or more and less than 100 mass %, more preferably 99.75 mass % or more and less than 100 mass %, and even more preferably 99.9 mass % or more and less than 100 mass %, based on the entire refrigerant according to the present disclosure.

The additional refrigerants are not limited, and can be selected from a wide range of known refrigerants widely used in the field. The mixed refrigerant may comprise a single additional refrigerant, or two or more additional refrigerants.

1-2 Use

The refrigerant according to the present disclosure can be preferably used as a working fluid in a refrigeration apparatus.

The composition comprising a refrigerant according to the present disclosure is suitable for use as an alternative refrigerant for HFC refrigerants, such as R410A, R407C, and R404A, as well as for HCFC refrigerants, such as R22. The composition comprising a refrigerant according to the present disclosure is particularly suitable for use as an alternative refrigerant for R410A among these.

2. Refrigerant Composition

The refrigerant composition according to the present disclosure comprises at least the refrigerant according to the present disclosure, and can be used for the same use as the refrigerant according to the present disclosure.

Moreover, the refrigerant composition according to the present disclosure can be further mixed with at least a refrigeration oil to thereby obtain a working fluid for a refrigeration apparatus.

The refrigerant composition according to the present disclosure further comprises at least one other component in addition to the refrigerant according to the present disclosure. The refrigerant composition according to the present disclosure may comprise at least one of the following other components, if necessary.

As described above, when the refrigerant composition according to the present disclosure is used as a working fluid in a refrigeration apparatus, it is generally used as a mixture with at least a refrigeration oil.

Thus, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, more preferably 0 to 0.5 mass %, even more preferably 0 to 0.25 mass %, and particularly preferably 0 to 0.1 mass %.

2-1 Water

The refrigerant composition according to the present disclosure may contain a small amount of water.

The water content of the refrigerant composition is preferably 0 to 0.1 mass %, more preferably 0 to 0.075 mass %, even more preferably 0 to 0.05 mass %, and particularly preferably 0 to 0.025 mass %, based on the entire refrigerant.

A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

2-2 Tracer

A tracer is added to the refrigerant composition according to the present disclosure at a detectable concentration so that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers. It is preferable that a compound that cannot be an impurity inevitably mixed into the refrigerant according to the present disclosure is selected as the tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, nitrous oxide ($N_2O$), and the like. Of these, hydrofluorocarbons, hydrochlorofluorocarbons, chlorofluorocarbons, hydrochlorocarbons, fluorocarbons, and fluoroethers are preferable.

Specifically, the following compounds (also referred to below as "tracer compounds") are more preferable as tracers.

HCC-40 (chloromethane, $CH_3Cl$)
HFC-41 (fluoromethane, $CH_3F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HCFC-22 (chlorodifluoromethane, $CHClF_2$)
HCFC-31 (chlorofluoromethane, $CH_2ClF$)
CFC-1113 (chlorotrifluoroethylene, $CF_2=CClF$)
HFE-125 (trifluoromethyl difluoro methyl ether, $CF_3OCHF_2$)
HFE-134a (trifluoromethyl fluoromethyl ether, $CF_3OCH_2F$)
HFE-143a (trifluoromethyl methyl ether, $CF_3OCH_3$)
HFE-227ea (trifluoromethyl tetrafluoro ethyl ether, $CF_3OCHFCF_3$)
HFE-236fa (trifluoromethyl trifluoroethyl ether, $CF_3OCH2CF_3$)

The tracer compound can be present in the refrigerant composition at a total concentration of 10 parts per million by weight (ppm) to 1000 ppm. The tracer compound is preferably present in the refrigerant composition at a total concentration of 30 ppm to 500 ppm, more preferably 50 ppm to 300 ppm, even more preferably 75 ppm to 250 ppm, and particularly preferably 100 ppm to 200 ppm.

2-3 Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. Of these, naphthalimide and coumarin are preferable.

2-4 Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, amines, and the like.

Examples of nitro compounds include aliphatic nitro compounds, such as nitromethane and nitroethane; aromatic nitro compounds, such as nitrobenzene and nitrostyrene; and the like.

Examples of ethers include 1,4-dioxane and the like.

Examples of amines include 2,2,3,3,3-pentafluoropropylamine, diphenylamine, and the like.

Examples of stabilizers also include butylhydroxyxylene, benzotriazole, and the like in addition to the nitro compounds, the ethers, and the amines.

The content of the stabilizer is not limited and is generally 0.01 to 5 mass %, preferably 0.05 to 3 mass %, more preferably 0.1 to 2 mass %, even more preferably 0.25 to 1.5 mass %, and particularly preferably 0.5 to 1 mass %, based on the entire refrigerant.

The stability of the refrigerant composition according to the present disclosure can be evaluated by a commonly used method without limitation. Examples of such methods include an evaluation method using the amount of free fluorine ions as an index according to ASHRAE Standard 97-2007, and the like. There is, for example, another evaluation method using the total acid number as an index. This method can be performed, for example, according to ASTM D 974-06.

2-5 Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, benzotriazole, and the like.

The content of the polymerization inhibitor is not limited and is generally 0.01 to 5 mass %, preferably 0.05 to 3 mass %, more preferably 0.1 to 2 mass %, even more preferably 0.25 to 1.5 mass %, and particularly preferably 0.5 to 1 mass %, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigeration apparatus. Specifically, the refrigeration oil-containing working fluid according to the present disclosure is obtained by mixing a refrigeration oil used in a compressor of a refrigeration apparatus with the refrigerant or the refrigerant composition.

The content of the refrigeration oil is not limited and is generally 10 to 50 mass %, preferably 12.5 to 45 mass %, more preferably 15 to 40 mass %, even more preferably 17.5 to 35 mass %, and particularly preferably 20 to 30 mass %, based on the entire refrigeration oil-containing working fluid.

3-1 Refrigeration Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture of refrigerants according to the present disclosure (the mixed refrigerant according to the present disclosure) and the stability of the mixed refrigerant according to the present disclosure, for example, can be suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil.

The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include compatibilizing agents described below.

3-2 Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, 1,1,1-trifluoroalkanes, and the like. Of these, polyoxyalkylene glycol ethers are preferable.

4. Method for Operating Refrigeration Apparatus

The method for operating a refrigeration apparatus according to the present disclosure is a method for operating a refrigeration apparatus using the refrigerant according to the present disclosure.

Specifically, the method for operating a refrigeration apparatus according to the present disclosure comprises the step of circulating the composition comprising a refrigerant according to the present disclosure as a working fluid in a refrigeration apparatus.

The refrigeration apparatus is, for example, at least one member selected from the group consisting of air-conditioning systems, refrigerators, freezers, water coolers, ice machines, refrigerated showcases, freezing showcases, freezing and refrigerating units, refrigerating machines for freezing and refrigerating warehouses, air-conditioning systems for vehicles, turbo refrigerating machines, and screw refrigerating machines.

5. Heat Transfer Medium and Heat Cycle System Using Heat Transfer Medium

The heat transfer medium according to the present disclosure comprises the composition containing a refrigerant according to the present disclosure.

The heat transfer medium according to the present disclosure can be suitably used for various heat cycle systems. A heat cycle system with high cooling capacity can be obtained by comprising the heat transfer medium according to the present disclosure.

Moreover, since the refrigerant according to the present disclosure has a sufficiently low GWP, a high degree of safety can be imparted to a heat cycle system by comprising the heat transfer medium according to the present disclosure, compared with the case of using an existing refrigerant.

Further, since the heat transfer medium according to the present disclosure has a low temperature glide, a highly stable heat cycle system can be provided.

The type of heat cycle system is not limited. Examples of heat cycle systems include room air conditioners, packaged air conditioners for stores, packaged air conditioners for buildings, packaged air conditioners for facilities, separate air conditioners connected with one or more indoor units and outdoor units through a refrigerant pipe, window air conditioners, portable air conditioners, rooftop or central air conditioners that send cool or warm air through a duct, gas engine heat pumps, air conditioners for trains, air conditioners for automobiles, built-in showcases, separate showcases, refrigerator-freezers for businesses, ice machines, integrated refrigeration apparatuses, vending machines, automobile air-conditioners, refrigeration apparatuses for cooling containers or refrigerators such as for marine shipping, air-conditioning systems for vehicles, turbo refrigerating machines, and apparatuses exclusively used for a heating cycle. Examples of apparatuses exclusively used for a heating cycle include water-heating devices, floor-heating devices, snow-melting devices, and the like.

As long as the heat cycle systems listed above comprise the heat transfer medium according to the present disclosure, the other features of the heat cycle systems are not limited. For example, such a heat cycle system may have a structure similar to that of a known heat cycle system.

EXAMPLES

The present disclosure is described in more detail below with reference to Examples. However, the present disclosure is not limited to the Examples.

Examples 1 to 18 and Comparative Examples 1 to 3

The GWP of the mixed refrigerant prepared in each of the Examples and Comparative Examples and the GWP of R410A (R32=50%/R125=50%) were evaluated based on the values in the Intergovernmental Panel on Climate Change (IPCC) fourth report.

Further, the COP and refrigerating capacity of the mixed refrigerant prepared in each of the Examples and Comparative Examples, and the COP and refrigerating capacity of R410A were determined by performing theoretical refrigeration cycle calculations for the mixed refrigerants using the National Institute of Science and Technology (NIST) and Reference Fluid Thermodynamic and Transport Properties Database (Refprop 9.0) under the following conditions.

Evaporating temperature: 45° C.
Condensation temperature: 5° C.
Superheating temperature: 5K
Subcooling temperature: 5K
Compressor efficiency: 70%

Tables 1 to 6 show GWP, COP, and refrigerating capacity, which were calculated based on these results. The COP ratio and the refrigerating capacity ratio each refer to a ratio (%) relative to R410A.

The coefficient of performance (COP) was determined according to the following formula.

$$COP = (\text{refrigerating capacity or heating capacity}) / \text{power consumption}$$

For the flammability of each mixed refrigerant, the burning velocity of the mixed refrigerant whose mixed formulation was adjusted to the WCF concentration was measured according to the ANSI/ASHRAE Standard 34-2013. Refrigerants having a burning velocity of 10 cm/s or less were determined to be classified as Class 2L (slightly flammable).

A burning velocity test was performed in the following manner. First, the mixed refrigerants used had a purity of 99.5% or more, and were degassed by repeating a cycle of freezing, pumping, and thawing until no trace of air was observed on the vacuum gauge. The burning velocity was measured by using the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The spread of the flame was visualized using schlieren photographs. A cylindrical container (inner diameter: 155 mm, length: 198 mm) equipped with two acrylic light transmission windows was used as the sample cell, and a xenon lamp was used as the light source. Schlieren images of the flame were recorded with a high-speed digital video camera at a frame rate of 600 fps and saved on a PC.

The flammable range of each mixed refrigerant was measured using a measurement device according to ASTM E681-09 (see FIG. 1).

Specifically, a 12-L spherical glass flask was used so that the combustion state could be visually observed and photographically recorded. When excessive pressure was generated by combustion in the glass flask, gas was allowed to escape from the upper lid. Ignition was achieved by electric discharge from electrodes disposed at one-third the distance from the bottom. The test conditions are as follows.

Test Conditions
Test vessel: 280-mm-dia, spherical (internal volume: 12 liters)
Test temperature: 60° C.±3° C.
Pressure: 101.3 kPa±0.7 kPa
Water: 0.0088 g±0.0005 g per gram of dry air
Mixing ratio of refrigerant composition/air: 1 vol. % increments ±0.2 vol. %
Mixture of refrigerant composition: ±0.1 wt %
Ignition method: AC discharge, voltage: 15 kV, electric current: 30 mA, neon transformer
Electrode spacing: 6.4 mm (¼ inch)
Spark: 0.4 seconds±0.05 seconds
Evaluation Criteria:
When the flame spread at an angle of more than 90° from the ignition point, it was evaluated that flame propagation was present (flammable).
When the flame spread at an angle of 90° or less from the ignition point, it was evaluated that flame propagation was absent (non-flammable).

TABLE 1

| Example/ Comparative Example | Composition ratio (mass %) | | GWP | COP ratio (%) (relative to R410A) | Refrigerating capacity ratio (%) (relative to R410A) | Temperature glide (K) |
| --- | --- | --- | --- | --- | --- | --- |
| | R744 | (E)-HFO-1132 | | | | |
| Example 1 | 5 | 95 | 1 | 96 | 103 | 2.9 |
| Example 2 | 10 | 90 | 1 | 94 | 109 | 5.1 |
| Example 3 | 20 | 80 | 1 | 90 | 120 | 8.2 |
| Example 4 | 30 | 70 | 1 | 87 | 131 | 9.8 |
| Example 5 | 40 | 60 | 1 | 83 | 142 | 10.2 |
| Comparative Example 1 | R410A 100% | | 2088 | 100 | 100 | 0.1 |

TABLE 2

| Example/ Comparative Example | Composition ratio (mass %) | | GWP | COP ratio (%) (relative to R410A) | Refrigerating capacity ratio (%) (relative to R410A) | Temperature glide (K) |
| --- | --- | --- | --- | --- | --- | --- |
| | R744 | HFO-1141 | | | | |
| Example 6 | 5 | 95 | 1 | 97 | 125 | 1.3 |
| Example 7 | 10 | 90 | 1 | 95 | 129 | 2.3 |
| Example 8 | 20 | 80 | 1 | 92 | 138 | 4.0 |
| Example 9 | 30 | 70 | 1 | 88 | 146 | 5.1 |
| Example 10 | 40 | 60 | 1 | 84 | 154 | 5.7 |
| Comparative Example 1 | R410A 100% | | 2088 | 100 | 100 | 0.1 |

TABLE 3

| Example/ Comparative Example | Composition ratio (mass %) | | GWP | COP ratio (%) (relative to R410A) | Refrigerating capacity ratio (%) (relative to R410A) | Temperature glide (K) |
| --- | --- | --- | --- | --- | --- | --- |
| | R744 | (Z)-HFO-1132 | | | | |
| Example 11 | 5 | 95 | 1 | 99 | 44 | 13.3 |
| Example 12 | 10 | 90 | 1 | 84 | 48 | 22.0 |
| Comparative Example 1 | R410A 100% | | 2088 | 100 | 100 | 0.1 |
| Comparative Example 2 | 0 | 100 | 1 | 115 | 39 | 0 |

TABLE 4

| Example/ Comparative Example | Composition ratio (mass %) | | GWP | COP ratio (%) (relative to R410A) | Refrigerating capacity ratio (%) (relative to R410A) | Temperature glide (K) |
| --- | --- | --- | --- | --- | --- | --- |
| | R744 | TFP | | | | |
| Example 13 | 5 | 95 | 1 | 101 | 71 | 5.9 |
| Example 14 | 10 | 90 | 1 | 97 | 77 | 10.1 |
| Comparative Example 1 | R410A 100% | | 2088 | 100 | 100 | 0.1 |
| Comparative Example 3 | 0 | 100 | 1 | 104 | 63 | 0 |

TABLE 5

| Example/Comparative Example | Composition ratio (mass %) | | | GWP | COP ratio (%) (relative to R410A) | Refrigerating capacity ratio (%) (relative to R410A) | Temperature glide (K) |
|---|---|---|---|---|---|---|---|
| | R744 | (E)-HFO-1132 | (E)-HFO-1234ze | | | | |
| Example 15 | 5 | 95 | 0 | 1 | 96 | 103 | 2.9 |
| Example 16 | 5 | 80 | 15 | 1 | 98 | 101 | 8.3 |
| Comparative Example 1 | R410A 100% | | | 2088 | 100 | 100 | 0.1 |

TABLE 6

| Example/Comparative Example | Composition ratio (mass %) | | | | GWP | COP ratio (%) (relative to R410A) | Refrigerating capacity ratio (%) (relative to R410A) | Temperature glide (K) | Flammable/non-flammable |
|---|---|---|---|---|---|---|---|---|---|
| | R744 | (E)-HFO-1132 | HFC-134a | HFC-32 | | | | | |
| Example 17 | 10 | 40 | 50 | 0 | 716 | 96 | 99 | 15.0 | Non-flammable |
| Example 18 | 10 | 35 | 50 | 5 | 749 | 97 | 99 | 14.8 | Non-flammable |
| Comparative Example 1 | R410A 100% | | | | 2088 | 100 | 100 | 0.1 | Non-flammable |

DESCRIPTION OF REFERENCE NUMERALS

1: Ignition source
2: Sample inlet
3: Springs
4: 12-liter glass flask
5: Electrodes
6: Stirrer
7: Insulated chamber

The invention claimed is:

1. A composition comprising a refrigerant, the refrigerant comprising $CO_2$ (R744), trans-1,2-difluoroethylene [(E)-HFO-1132], fluoroethylene (HFO-1141), and 3,3,3-trifluoropropyne (TFP).

2. The composition according to claim 1, wherein R744 is present in an amount of 0.1 to 50 mass %, and the total of (E)-HFO-1132, HFO-1141 and TFP is present in an amount of 50 to 99.9 mass %, based on the total amount of R744, (E)-HFO-1132, HFO-1141 and TFP taken as 100 mass %.

3. The composition according to claim 1, wherein the refrigerant further comprises at least one compound B selected from the group consisting of tetrafluoromethane (FC-14), trifluoromethane (HFC-23), difluoromethane (HFC-32), pentafluoroethane (HFC-125), 1,1,1,2-tetrafluoroethane (HFC-134a), 1,1,2,2-tetrafluoroethane (HFC-134), 1,1-difluoroethane (HFC-152a), 1,2-difluoroethane (HFC-152), 1,1,1-trifluoroethane (HFC-143a), 1,1,2-trifluoroethane (HFC-143), 1,1,1,2,3,3,3-heptafluoropropane (HFC-227ea), 2,3,3,3-tetrafluoropropene (HFO-1234yf), trans-1,3,3,3-tetrafluoropropene [(E)-HFO-1234ze], 1,2,3,3,3-pentafluoropropene (HFO-1225ye), 3,3,3-trifluoropropene (HFO-1243zf), and difluoropropene (HFO-1252).

4. The composition according to claim 1, for use as an alternative refrigerant for R410A.

5. The composition according to claim 1, the composition further comprising a refrigeration oil and being for use as a working fluid for a refrigeration apparatus.

6. A refrigeration apparatus comprising the composition according to claim 1 as a working fluid.

7. A heat transfer medium comprising the composition according to claim 1.

8. A heat cycle system using the heat transfer medium according to claim 7.

* * * * *